United States Patent [19]

Watanabe

[11] 4,164,402
[45] Aug. 14, 1979

[54] STRENGTHENING OF THIN-WALLED, LIGHT GLASS CONTAINERS

[75] Inventor: Muneo Watanabe, Nishinomiya, Japan

[73] Assignee: Yamamura Glass Co., Ltd., Nishinomiya, Japan

[21] Appl. No.: 881,257

[22] Filed: Feb. 27, 1978

[51] Int. Cl.² ............... C03C 15/00; C03C 17/00; C03C 21/00
[52] U.S. Cl. ............... 65/30 E; 65/30 R; 65/60 R; 65/60 B
[58] Field of Search ............... 65/30 E, 30 R, 60 R, 65/60 B

[56] References Cited

U.S. PATENT DOCUMENTS

| 3,751,238 | 8/1973 | Grego et al. | 65/30 E |
| 3,844,754 | 10/1974 | Grubb et al. | 65/30 E |
| 4,021,218 | 5/1977 | Watanabe | 65/30 E |

FOREIGN PATENT DOCUMENTS

| 1582049 | 4/1967 | France | 65/30 E |
| 4744522 | 11/1962 | Japan | 65/30 E |
| 452319 | 10/1965 | Japan | 65/30 E |
| 4530714 | 8/1967 | Japan | 65/30 E |

Primary Examiner—Richard V. Fisher
Assistant Examiner—Frank W. Miga
Attorney, Agent, or Firm—Haight & Huard

[57] ABSTRACT

Thin-walled, light glass containers formed by the press and blow process may be strengthened by (1) exposing the internal surface of said containers to the action of an agent capable of decreasing the amount of extractable alkali from said surface at an elevated temperature immediately after the blowing process but before the annealing process;

(2) passing the containers through the annealing station; and (3) subjecting the external and internal surfaces of said glass containers to a treatment of exchanging sodium ions in the surface portion with potassium ions to form a compressive stress layer in said surface portion.

6 Claims, No Drawings

STRENGTHENING OF THIN-WALLED, LIGHT GLASS CONTAINERS

This invention related to a process for treating glass containers such as glass bottles made of soda-lime glass to improve their strength. More particularly it relates to a process for treating thin-walled, light glass containers formed by the so-called press and blow process to improve their strength.

Thin-walled, light containers such as glass bottles are conventionally formed by the so-called press and blow process wherein parisons are produced from molten glass gobs prior to the final blowing step by thrusting a plunger into the gob in respective blank molds to form a cavity. Due to rubbing of internal surface of the parison with the plunger during the process, a number of flaws are formed on the internal surface of the resulting bottles. This greatly reduces the strength, especially impact strength, of the resulting glass bottles. Various attempts have hitherto been made to avoid this defect but they are not satisfactory.

It has been known that glass containers may be strengthned by exchanging sodium ions in a surface portion thereof with potassium ions to form a compressive stress layer.

It was found, however, that this ion-exchange treatment alone is not sufficiently effective to improve the strength of the thin-walled, light glass containers formed by the press and blow process, even applied to the internal surface, to improve the strength to a commercially acceptable level.

It is a main object of the present invention to provide a process for treating thin-walled, light glass containers formed by the press and blow process to improve their strength at least to a commercially acceptable level.

According to the present invention, it has been found that when the internal surfaces of the glass containers are exposed to the action of an agent capable of decreasing the amount of extractable alkali from said surface at an elevated temperature immediately after the blowing process but before the annealing process and then the resulting containers are treated to form a compressive stress layer by exchanging sodium ions with potassium ions in both the external and internal surface portions thereof, the strength, particularly impact strength, of the resulting containers is synergistically greatly improved more effectively than with either the extractable-alkali decreasing treatment or the ion-exchange treatment alone. Preferably the glass container may be provided with a coating layer of a metal oxide on the external surface prior to the extractable-alkali decreasing treatment to increase abrasion resistance.

The process of the present invention comprises the steps of:

(1) exposing the internal surface of a sodium-containing glass container to the action of an agent capable of decreasing the amount of extractable alkali from said surface at an elevated temperature immediately after the blowing process but before the annealing process;

(2) passing the container through the annealing station; and (3) subjecting said external and internal surfaces of said glass container to a treatment for exchanging sodium ions in the surface portion with potassium ions to form a compressive stress layer in said surface portion.

In a preferred embodiment of the present invention, said ion-exchanging step comprises applying a relatively concentrated aqueous solution of a mixture of potassium nitrate and a potassium salt selected from the group consisting of potassium chloride and potassium sulfate onto the external and internal surfaces of the glass container while the temperature of the solution is higher than that of the container so that said mixture precipitates out on said surfaces due to the temperature differential between the solution and the container to form a solid layer of said mixture, maintaining the glass container at an elevated temperature below but near the strain point of said glass to cause said ion-exchanging reaction for a length of time sufficient to form a compressive stress layer on said surfaces, cooling the glass container to room temperature and removing said solid layer of said mixture.

It is known in the art to provide glass bottles with a coating of oxides of a metal such as tin, titanium, zirconium or vanadium to impart the bottles with abrasion resistance.

The coating, when applied to the present invention, will protect the subsequently formed compressive stress layers of the bottles from being damaged during their handling such as inspection, washing, bottling, shipping or transportation.

The coating may conveniently be applied onto the external surface of the containers at an elevated temperature immediately after the blowing process in a conventional manner by contacting the external surface of the container with vapors of a coating agent. Examples of such coating agent include tin compounds such as a tin tetrachloride, dimethyltin dichloride, tin dichloride, dimethyltin diacetate, stannous oleate, stannous stearate or stannous palmitate; titanium compounds such as titanium tetrachloride, tetrabutyl titanate, isopropyl titanate, tetrahexyl titanate; zirconium compounds such as $C_1$–$C_8$ alkyl zirconate, e.g. tetrabutyl zirconate or zirconium tetrachloride; and vanadium compounds such as $C_1$–$C_8$ alkyl vanadinate, e.g. n-butyl vanadinate, vanadium trichloride, vanadium tetrachloride, vanadium pentoxide, ammonium metavanadinate or vanadium tetraoxide.

The treatment for decreasing the amount of extractable alkali from the internal surface of the glass containers may be carried out by introducing an agent capable of decreasing the amount of extractable alkali from soda-lime glasses into the interior of the containers, passing the containers through the annealing station and washing the containers, if necessary.

The agents which may be used in this treatment may be classified into three types. The first one is those capable of forming a soluble sodium salt upon reaction with the sodium present in the surface portion of the glass. For example, ammonium chloride decomposes at an elevated temperature to generate a gas as follows:

$$NH_4Cl \rightarrow HCl + NH_3$$

The HCl formed then reacts with sodium as follows:

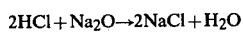

$$2HCl + Na_2O \rightarrow 2NaCl + H_2O$$

The NaCl formed may be removed by washing the containers with water. Thus the amount of extractable alkali is greatly decreased by the treatment with ammonium chloride. Similarly other extractable alkali decreasing agents such as ammonium sulfate, aluminum chloride, elemental sulfur or sulfur dioxide may be used for this purpose.

The second type of the agent includes fluorine containing substances disclosed in the U.S. Pat. No. 3,314,772 to James P. Poole et al, to which reference is made. The fluorine containing substances such as Teflon or Freon supply fluoride ions to the surface of the glass to be treated upon pyrolysis thereof at an elevated temperature so that oxygen ions and hydroxyl ions at such surface are replaced by fluoride ions. This exchange of fluoride ions for oxygen ions and hydroxyl ions may remarkablly decrease the amount of extractable-alkali from the treated surface.

Water is known to react with the glass surface to decrease the amount of extractable-alkali therefrom (see column 2, lines 10-19 of said U.S. Pat. No. 3,314,772 to James P. Poole et al). I have found that water may be successfully employed as the third type of the agent for use in this treatment.

The above described extractable-alkali decreasing treatment and the reagents used therefor are well-known in the art. However such treatment has been known to be only for improving chemical durability of soda-lime glasses. Accordingly, it is surprising that such treatment in combination with the ion-exchange treatment synergistically improves in the impact strength of the molded glass containers formed by the press and blow process.

The ion-exchange treatment per se and the technique therefor are also well-known in the art. However, those using admixtures of potassium nitrate with potassium chloride, potassium sulfate or both in the form of a concentrated aqueous solution are most preferable, though other processes may be employed with equivalent results. Firstly, the mentioned potassium salts do not etch the glass. Secondly, the mixture occurs partly as liquid phase and partly as solid phase at the ion-exchange temperature, i.e. a temperature below but near the strain point of the glass. This enables the surface of the glass containers to be wetted with the molten ion-exchanging agent without being blown off from the surface during the treatment. The proportion of the mixture of potassium nitrate with other salt is such that about 10 to 80% of the mixture remains as solid at the ion-exchanging temperature. Deposition of the mixture on the external and internal surfaces of the container may preferably be carried out by utilizing a temperature differential between the glass container and the solution. Thus, the mixture is dissolved in water to saturation or near saturation at a temperature sufficiently higher than that of the glass container and the solution is applied to the container. The temperature differential may preferably be less than 75° C. and varies depending upon the thickness of particular containers.

The solution may contain an effective amount of a surfactant for improving wettability thereof. Examples of the surfactant include anionic surfactants such as R—$(C_2H_4O)_n$OSO$_3$Na wherein R is $C_8$–$C_{18}$ alkyl and n is an integer of 1–6, R—$C_6H_4$—$(OC_2H_4)_n$OSO$_3$Na wherein R is $C_8$–$C_9$ alkyl and n is an integer of 1–6, ROSO$_3$N$_n$ wherein R is $C_8$–$C_{18}$ alkyl; cationic surfactants such as [RN$^+$(CH$_3$)$_3$] Cl$^-$ wherein R is $C_8$–$C_{18}$ alkyl; and ampholytic surfactants such as

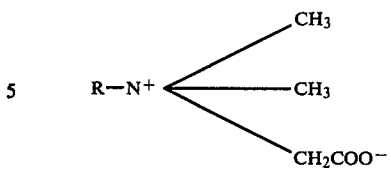

wherein R is $C_{12}$–$C_{18}$ alkyl. The preferred range of concentration of the surfactant lies between 0.2 and 1.2% by volume.

After deposition, the mixture on the glass the surface is dried to form a solid layer. If the layer is not formed in the desired thickness by a single operation, the same procedure may be repeated.

The resulting glass containers are then maintained at an elevated temperature below but near the strain point of the glass for a sufficient length of time, e.g. for about 30 to 80 minutes. A thermo-chemical reaction takes place between the potassium salt and the glass material to exchange sodium ions present in the surface portion of the container with potassium ions, whereby a compressive stress layer is formed both on the external and internal surfaces.

The layer of the mixture of potassium salts may be simply removed by washing the container with water after cooling.

The resulting glass containers have an impact strength greater than the corresponding glass containers which have been subjected to only the similar ion-exchange treatment or the similar extractable-alkali decreasing treatment alone. Correspondingly, the minimum value of the impact strength also increases by the process of the present invention. These are particularly advantageous because the glass containers can be much thinner and lighter than conventional containers when the same level of the strength is desired.

The following example serves to illustrate the present invention and should not be construed as limiting its scope.

All parts and percentages therein are by weight unless otherwise indicated.

EXAMPLE 1

Thin-walled, light glass bottles (wide mouth, coffee bottle, weighing 273 g., 2.5 mm thick) were produced by the press and blow process. The glass was a conventional soda-lime glass having a strain point of 505° C. and the following composition: 72% SiO$_2$, 2% Al$_2$O$_3$, 14% Na$_2$O, 0.1% K$_2$O, 10% CaO, 0.4% MgO and trace impurities.

The bottles were contacted on their external surface with vapor of tin tetrachloride immediately after the formation of these bottles and thus prior to their annealing. The temperature of these bottles at this time was between about 500° C. and 600° C. A coating of stannic oxide was thus formed on the external surface. Then about 0.2 to about 0.5 g. of an extractable-alkali decreasing agent shown in Table I was placed into the interior of the bottles and the bottles were annealed.

After passing through the annealing lehr the bottles were washed with water.

69.0 g. of potassium chloride, 34.7 g. of potassium nitrate, 8.5 g. of potassium sulfate and 0.5 ml of an anionic surfactant were added in 200 ml of water and the mixture was heated to 70° C. to make a solution. The bottles were treated with the solution by injection of the solution into the interior of the bottles and then drying to form a layer of deposition of the mixed potassium salts on the internal surface. The same layer of deposition of the mixed potassium salts was formed on the external surface of the bottles by dipping the bottles into the same solution and then drying. The bottles thus treated were heated at 500° C. for 1 hour, cooled to room temperature and washed with water.

The impact strength of the resulting bottles was determined in accordance with JIS S-2302 (striking point was 80 mm above the bottom). For comparison, the strength of corresponding bottles which had been subjected to only the extractable-alkali decreasing treatment or the ion-exchange treatment alone, and of bottles which hd not been had to the above two treatments, were determined.

The data obtained are shown in Table I.

Table I

| Extractable alkali decreasing agent | | Impact Strength of Untreated and Treated Bottles | | | |
|---|---|---|---|---|---|
| | | Untreated | Decrease in extractable alkali along | Ion-Exchange alone | Decrease in extractable alkali +Ion Exchange |
| Sulfur Powder | $\bar{x}$ | 7.6 | 9.0 | 10.55 | 13.0 |
| | Min | 2 | 4 | 5 | 6 |
| | % | 100 | 118 | 139 | 171 |
| $SO_2$ gas | $\bar{x}$ | " | 9.3 | " | 14.4 |
| | Min | " | 4 | " | 7 |
| | % | " | 122 | " | 189 |
| $NH_4Cl$ | $\bar{x}$ | " | 9.6 | " | 15.2 |
| | Min | " | 3 | " | 6 |
| | % | | 126 | | 200 |
| $(NH_4)_2SO_4$ | $\bar{x}$ | | 9.2 | | 13.5 |
| | Min | " | 3 | " | 5 |
| | % | | 121 | | 178 |
| $AlCl_3$ | $\bar{x}$ | | 8.8 | | 12.0 |
| | Min | " | 3 | " | 5 |
| | % | | 116 | | 158 |
| $(NH_4)_2SO_4$ + $AlCl_3$ (10:1) | $\bar{x}$ | | 8.8 | | 13.0 |
| | Min | " | 4 | " | 5 |
| | % | | 116 | | 171 |
| $NH_4Cl$ + $AlCl_3$ (10:1) | $\bar{x}$ | | 9.6 | | 12.9 |
| | Min | " | 5 | " | 7 |
| | % | | 126 | | 170 |
| $(NH_4)_2SO_4$ + $NH_4Cl$ (1:1) | $\bar{x}$ | | 9.8 | | 13.2 |
| | Min | " | 5 | " | 6 |
| | % | | 129 | | 174 |
| Teflon | $\bar{x}$ | | 8.8 | | 12.6 |
| | Min | " | 3 | " | 7 |
| | % | | 116 | | 166 |
| Water mist | $\bar{x}$ | " | 9.1 | " | 12.7 |
| | Min | " | 4 | " | 6 |
| | % | " | 120 | | 167 |

$\bar{x}$ = mean value of 20 bottles in kg. cm
Min = minimum value in kg. cm

The above example and other specific information contained herein are for purposes of illustration only, and such alterations and modifications thereof as would be apparent to those skilled in the art are deemed to fall within the scope and spirit of the invention, bearing in mind the invention is defined only by the claims appended hereto.

What is claimed is:

1. In a process for strengthening thin-walled, light containers made of soda-lime glass comprising the steps of molding said containers by the press-and-blow process, annealing the glass containers and thereafter exchanging sodium ions present in the surface portion of the external surface and the internal surface of said containers with potassium ions to form a compressive stress layer in said surface portion, the improvement which comprises the pretreatment step of placing a compound selected from the group consisting of elemental sulfur, sulfur dioxide, ammonium chloride, ammonium sulfate, aluminum chloride, water, a fluorine-containing substance and a mixture thereof into the interior of said containers immediately after the molding step but before the annealing step at an elevated temperature so that only said internal surface of said containers reacts with the gas generated from said compound at said elevated temperature to decrease the amount of extractable alkali on said internal surface.

2. The process of claim 1, wherein said sodium ion-exchanging step comprises applying a relatively concentrated aqueous solution of a mixture of potassium nitrate and a potassium salt selected from the group consisting of potassium chloride and potassium sulfate onto the external and internal surfaces of the glass containers while the temperature of the solution is higher than that of the containers so that said potassium salt precipitates out on said surfaces due to the temperature differential between the solution and the containers to form a solid layer of said mixture, maintaining the glass containers at an elevated temperature below but near the strain point of said glass to cause said ion-exchanging reaction for a length of time sufficient to form a compressive stress layer on said surfaces, cooling the glass containers to room temperature and removing said solid layer of said mixture.

3. The process of claim 2, wherein said mixture has such proportion that about 10% to 80% of the mixture occurs as a solid phase at said temperature below but near the strain point of said glass.

4. The process of claim 2, wherein said temperature differential is less than 75° C.

5. The process of claim 1, which further includes the step of applying an abrasion-resistant coating of a metal oxide on the external surface of said glass container at an elevated temperature immediately after the blowing process but before the pretreatment process.

6. The process of claim 5, wherein said metal oxide is selected from the group consisting of tin oxide, titanium oxide, zirconium oxide and vanadium oxide.

* * * * *